(12) United States Patent
Rioja et al.

(10) Patent No.: US 9,067,623 B2
(45) Date of Patent: Jun. 30, 2015

(54) CRASHWORTHY STRUCTURES FORMED OF MULTILAYERED METALLIC MATERIALS

(71) Applicant: ALCOA INC., Pittsburgh, PA (US)

(72) Inventors: Roberto J. Rioja, Murrysville, PA (US); Brett P. Conner, Allison Park, PA (US); Rajeev G. Kamat, Marietta, GA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 13/853,007

(22) Filed: Mar. 28, 2013

(65) Prior Publication Data

US 2013/0270859 A1    Oct. 17, 2013

Related U.S. Application Data

(60) Provisional application No. 61/616,995, filed on Mar. 28, 2012, provisional application No. 61/659,880, filed on Jun. 14, 2012, provisional application No. 61/792,361, filed on Mar. 15, 2013.

(51) Int. Cl.
*B62D 29/00*    (2006.01)
*B62D 21/15*    (2006.01)
(Continued)

(52) U.S. Cl.
CPC ............ *B62D 29/008* (2013.01); *C22F 1/04* (2013.01); *B32B 15/016* (2013.01); *B62D 21/15* (2013.01); *B62D 25/00* (2013.01); *C22C 21/06* (2013.01); *C22C 21/10* (2013.01); *C22F 1/047* (2013.01); *C22F 1/053* (2013.01)

(58) Field of Classification Search
CPC ....... B62D 21/15; B62D 29/00; B62D 29/008
USPC ........ 296/187.01, 203.01, 205; 293/102, 132, 293/133
See application file for complete search history.

(56) References Cited

U.S. PATENT DOCUMENTS 5,667,602 A * 9/1997 Fang et al. .................... 148/549
8,083,871 B2 * 12/2011 Lin et al. ...................... 148/440
(Continued)

FOREIGN PATENT DOCUMENTS

AU    2011226797 A1    3/2012

OTHER PUBLICATIONS

International Search Report and Written Opinion issued in connection with International Application No. PCT/US2013/034499 dated Jul. 1, 2013.
(Continued)

*Primary Examiner* — Gregory Blankenship
(74) *Attorney, Agent, or Firm* — Greenberg Traurig, LLP

(57) ABSTRACT

An automobile component including an aluminum alloy product having a base aluminum alloy layer and a first additional aluminum alloy layer disposed directly on the base layer. The base aluminum alloy layer includes 2.0 to 22 wt. % zinc and the zinc is a predominate alloying element of the base layer other than aluminum and the first additional aluminum alloy layer includes 0.20 to 8.0 wt. % magnesium and the magnesium is a predominate alloying element of the first additional aluminum alloy layer other than aluminum. The automobile component may include outer panel sections, high form inner sections, reinforcement sections, crash sections, large flat panel sections, and high strength sections and, when tested in a static axial crush test, a peak load of the automobile component increases at least 20% when compared to alloy 6014 in the T6 temper.

21 Claims, 18 Drawing Sheets

(51) Int. Cl.
*C22F 1/04* (2006.01)
*B32B 15/01* (2006.01)
*B62D 25/00* (2006.01)
*C22C 21/06* (2006.01)
*C22C 21/10* (2006.01)
*C22F 1/047* (2006.01)
*C22F 1/053* (2006.01)

(56) References Cited

U.S. PATENT DOCUMENTS

2009/0242087 A1* 10/2009 Morita et al. ............... 148/690
2010/0279143 A1 11/2010 Kamat et al.
2011/0252956 A1 10/2011 Sawtell et al.
2012/0168045 A1* 7/2012 Ihara et al. ............... 148/690
2013/0017406 A1* 1/2013 Kinefuchi et al. ............ 428/594
2013/0270859 A1* 10/2013 Rioja et al. ............... 296/187.01
2014/0353990 A1* 12/2014 Ishitobi et al. ............. 293/133

OTHER PUBLICATIONS

European Aluminum Association, The Aluminum Automotive Manual; Mar. 27, 2012 Retrieved on Jun. 12, 2013 <<http://www.alueurope.eu/wp-content/uploads/2012/03/AAM-Design-3-for-functional-performance_2.pdf>>.

Conner, "Design and Optimization of Aluminum Structures for the 21st Century Navy", Jun. 15, 2010 Retrieved on Jun. 12, 2013 <<http://www.nsrp.org/6-Presentations/SDMT/061510_Design_and_Optimization_of_Aluminum_Structures_for_the_21st_Century_Navy_Conner.pdf>>.

* cited by examiner

CRASHWORTHY STRUCTURES FORMED OF MULTILAYERED METALLIC MATERIALS

RELATED APPLICATIONS

This application claims the benefit of U.S. Provisional Application No. 61/616,995, entitled "METHODS OF MANUFACTURING MULTILAYERED METALLIC MATERIALS CRASHWORTHY STRUCTURES," filed Mar. 28, 2012; U.S. Provisional Application No. 61/598,880, entitled "METHODS OF MANUFACTURING MULTI-LAYERED METALLIC MATERIALS CRASHWORTHY STRUCTURES," filed Jun. 14, 2012; and U.S. Provisional Application No. 61/792,361, entitled "METHODS OF MANUFACTURING MULTILAYERED METALLIC MATERIALS CRASHWORTHY STRUCTURES" filed Mar. 15, 2013 which are hereby incorporated by reference herein in their entirety for all purposes.

TECHNICAL FIELD

The present disclosure relates to multilayered aluminum alloy structures suitable for use in the automobile industry.

BACKGROUND

Prior methods for manufacturing aluminum alloy structures are generally known.

SUMMARY OF INVENTION

In some embodiments, the present invention includes an automobile component that includes an aluminum alloy product. In some embodiments, the aluminum alloy product includes a base aluminum alloy layer and at least a first additional aluminum alloy layer disposed directly on the base layer; wherein the base layer has a first aluminum alloy composition that includes 2.0-22 wt. % zinc and the zinc is a predominate alloying element of the base layer other than aluminum.

In some embodiments, the first additional aluminum alloy layer has a second aluminum alloy composition that includes 0.20-8.0 wt. % magnesium and the magnesium is a predominate alloying element of the first additional aluminum alloy layer other than aluminum.

In some embodiments, the automobile component is selected from the group consisting of outer panel sections, high form inner sections, reinforcement sections, crash sections, large flat panel sections, and high strength sections; and when tested in a static axial crush test, a peak load of the automobile component increases at least 20% when compared to alloy 6014 in the T6 temper.

In some embodiments, the aluminum alloy product further includes a second additional aluminum alloy layer. In some embodiments, the second additional aluminum alloy layer has a third aluminum alloy composition.

In some embodiments, the first additional aluminum alloy layer and the second additional aluminum alloy layer have the same compositions. In some embodiments, the base layer is positioned between the first additional aluminum alloy layer and the second additional aluminum alloy layer.

In some embodiments, a thickness of the base layer comprises between 20% and 50% of a thickness of the aluminum alloy product.

In some embodiments, the first additional aluminum alloy layer and the second additional aluminum alloy layer are 5xxx series alloys. In some embodiments, the first additional aluminum alloy layer and the second additional aluminum alloy layer are 5456 alloys and the base layer is a 7xxx series alloy.

In some embodiments, the base layer is a 7085 alloy. In some embodiments, when tested in a static axial crush test, a mean load of the aluminum alloy product increases at least 10% when compared to alloy 6014 in the T6 temper.

In some embodiments, the automobile component is a crash section.

In some embodiments, the method of the present invention includes:

(a) receiving an aluminum alloy body; wherein the aluminum alloy body comprises a base aluminum alloy layer and at least a first additional aluminum alloy layer disposed directly on the base layer; wherein the base layer has a first aluminum alloy composition that includes 2.0-22 wt. % zinc and the zinc is a predominate alloying element of the base layer other than aluminum; wherein the first additional aluminum alloy layer has a second aluminum alloy composition that includes 0.20-8 wt. % magnesium and the magnesium is a predominate alloying element of the first additional aluminum alloy layer other than aluminum; and (b) rolling the aluminum alloy body; (c) thermally treating the rolled aluminum alloy body; and (d) forming the thermally treated aluminum alloy body into an automobile component selected from the group consisting of outer panel sections, high form inner sections, reinforcement sections, crash sections, large flat panel sections, and high strength sections, wherein, when tested in a static axial crush test, a peak load of the automobile component increases at least 20% when compared to alloy 6014 in the T6 temper.

In some embodiments, the aluminum alloy body further comprises a second additional aluminum alloy layer.

In some embodiments, the first additional aluminum alloy layer and the second additional aluminum alloy layer are 5xxx series alloys and the based layer is a 7xxx series alloy.

In some embodiments, the first additional aluminum alloy layer and the second additional aluminum alloy layer are 5456 alloys and the base layer is a 7085 alloy.

In some embodiments, the rolling step comprises hot rolling, cold rolling, and/or combinations thereof.

In some embodiments, the rolling step comprises at least an 80% reduction in a thickness of the aluminum alloy body.

In some embodiments, the thermal treatment step comprises heating the rolled aluminum alloy body to a temperature of at least 250 degrees Fahrenheit for a duration of at least 4 hours.

In some embodiments, the thermal treatment step comprises heating the rolled aluminum alloy body to a temperature of at least 250 degrees Fahrenheit for a duration of 24 hours.

In some embodiments, the thermal treatment step further comprises heating the rolled aluminum body to a temperature of at least 300 degrees Fahrenheit for a duration of at least 4 hours.

In some embodiments, the forming step comprises forming the thermally treated aluminum alloy body into a crash section.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
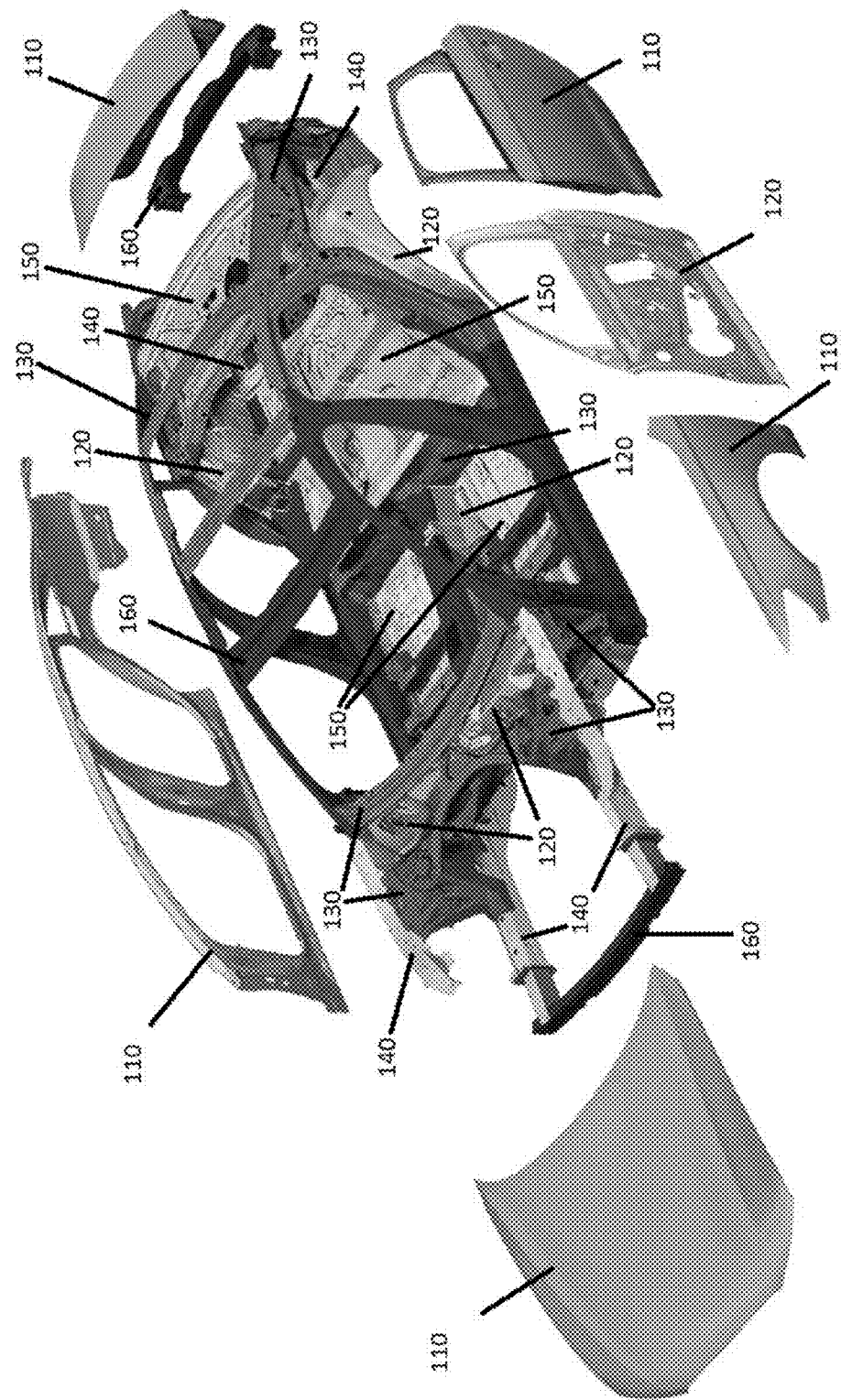
FIG. 1 illustrates features of some embodiments of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The present invention will be further explained with reference to the attached figures, wherein like structures are referred to by like numerals throughout the several views. The drawings shown are not necessarily to scale, with emphasis instead generally being placed upon illustrating the principles of the present invention. Further, some features may be exaggerated to show details of particular components.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

While certain embodiments of the present methods will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention.

In some embodiments, the present invention includes an automobile component that includes an aluminum alloy product. In some embodiments, the automobile component includes any component of an automobile potentially affected during a crash. In some embodiments, the automobile component may include outer panel sections 110, high form inner sections 120, reinforcement sections 130, crash sections 140, large flat panel sections 150, and/or high strength sections 160 as shown on FIG. 1.

In some embodiments, the automobile component of the present invention may include a crash section 140. In some embodiments, crash sections 140 may also be referred to as front and rear longitudinals of the vehicle frame body and/or crush boxes.

In some embodiments, the automobile component includes an aluminum alloy product having a base aluminum alloy layer and at least a first additional aluminum alloy layer deposited directly on the base layer. In some embodiments, the base aluminum alloy layer and first additional aluminum alloy layer are cast by roll bonding, sequential alloy casting ("SAC"), direct chill casting, and/or other method for forming a multilayer product. In some embodiments, the base aluminum alloy layer and first additional aluminum alloy layer are cast in discrete or graduated layers.

In an embodiment, the aluminum alloy product is produced via a SAC method. In some embodiments, the SAC method includes providing a first molten metal to an ingot caster, and filing the caster with the first molten metal to a predetermined height. In some embodiments, the SAC method then includes providing a second molten metal to the ingot caster, and filing the caster with the second molten metal to a second predetermined height. Third, fourth, and so on layers may be added in the similar manner. In this method, the caster may be uniform at each point in a horizontal plane and may change as one "goes up" a vertical plane. In an embodiment, 100% purity of the first metal may be added before any of the second metal is added, and then 100% purity of the second metal may be added (called a "discrete method"). In another embodiment, at least 50% of the first metal and less than 50% of the second metal may be added as the first layer, and the amount of second metal may increase (while the amount of first metal decreases) as metal is added (called a "gradient or graduated method").

In some embodiments, the base aluminum alloy layer may include ASTM standard aluminum alloy from 1xxx, 2xxx, 3xxx, 4xxx, 5xxx, 6xxx, 7xxx, and 8xxx series. In some embodiments, the base aluminum alloy layer composition includes 2.0-22 wt. % zinc and zinc is a predominate alloying element of the base aluminum alloy layer other than aluminum. In some embodiments, the base aluminum alloy layer composition includes 2.0-15 wt. % zinc. In some embodiments, the base aluminum alloy layer composition includes 5.0-10 wt. % zinc. In some embodiments, the base aluminum alloy layer composition includes 3.0-10 wt. % zinc. In some embodiments, the base aluminum alloy layer composition includes 6.0-8.0 wt. % zinc. In some embodiments, the base aluminum alloy layer composition includes 2.0 wt. % zinc. In some embodiments, the base aluminum alloy layer composition includes 5.0 wt. % zinc. In some embodiments, the base aluminum alloy layer composition includes 7.0 wt. % zinc. In some embodiments, the base aluminum alloy layer composition includes 15.0 wt. % zinc.

In some embodiments, the base aluminum alloy layer is a 7xxx series alloy. In some embodiments, the base layer is a 7085 alloy. In some embodiments, the base aluminum alloy layer is 7085-T7E02.

In some embodiments, the thickness of the base aluminum alloy layer ranges from 10% to 80% of the thickness of the aluminum alloy product. In some embodiments, the thickness of the base aluminum alloy layer ranges from 20% to 70% of the thickness of the aluminum alloy product. In some embodiments, the thickness of the base aluminum alloy layer ranges from 15% to 60% of the thickness of the aluminum alloy product. In some embodiments, the thickness of the base aluminum alloy layer ranges from 20% to 50% of the thickness of the aluminum alloy product. In some embodiments, the thickness of the base aluminum alloy layer is less than 70% of the thickness of the aluminum alloy product. In some embodiments, the thickness of base aluminum alloy layer is less than 50% of the thickness of the aluminum alloy product. In some embodiments, the thickness of the base aluminum alloy layer is 20% of the thickness of the aluminum alloy product. In some embodiments, the thickness of the base aluminum alloy layer is 30% of the thickness of the aluminum alloy product. In some embodiments, the thickness of the base aluminum alloy layer is 40% of the thickness of the aluminum alloy product. In some embodiments, the thickness of the base aluminum alloy layer is 50% of the thickness of the aluminum alloy product.

In some embodiments, the first additional aluminum alloy layer may include ASTM standard aluminum alloy from 1xxx, 2xxx, 3xxx, 4xxx, 5xxx, 6xxx, 7xxx, and 8xxx series. In some embodiments, the first additional aluminum alloy layer composition includes 0.20-8.0 wt. % magnesium and the magnesium is a predominate alloying element of the first additional aluminum alloy layer other than aluminum. In some embodiments, the first additional aluminum alloy layer composition includes 0.20-8.0 wt. % magnesium. In some embodiments, the first additional aluminum alloy layer composition includes 1.0-7.0 wt. % magnesium. In some embodiments, the first additional aluminum alloy layer composition includes 2.0-6.0 wt. % magnesium. In some embodiments, the first additional aluminum alloy layer composition includes 3.0-5.0 wt. % magnesium. In some embodiments, the first additional aluminum alloy layer composition includes 0.5-7.0 wt. % magnesium. In some embodiments, the first additional aluminum alloy layer composition includes 0.2 wt. % magnesium. In some embodiments, the first additional aluminum alloy layer composition includes 1.0 wt. % magnesium. In some embodiments, the first additional aluminum alloy layer composition includes 3.0 wt. % magnesium. In some embodiments, the first additional aluminum alloy layer composition includes 5.0 wt. % magnesium.

In some embodiments, the first additional aluminum alloy layer is a 5xxx series alloy. In some embodiments, the first additional aluminum alloy layer is a 5456 alloy. In some embodiments, the first additional aluminum alloy is a 5454 alloy.

In some embodiments, the thickness of the first additional aluminum alloy layer ranges from 10% to 80% of the thickness of the aluminum alloy product. In some embodiments, the thickness of the first additional aluminum alloy layer ranges from 20% to 70% of the thickness of the aluminum alloy product. In some embodiments, the thickness of the first additional aluminum alloy layer ranges from 15% to 60% of the thickness of the aluminum alloy product. In some embodiments, the thickness of the first additional aluminum alloy layer ranges from 20% to 50% of the thickness of the aluminum alloy product. In some embodiments, the first additional aluminum alloy layer is less than 70% of the thickness of the aluminum alloy product. In some embodiments, the thickness of the first additional aluminum alloy layer is less than 50% of the thickness of the aluminum alloy product. In some embodiments, the thickness of the first additional aluminum alloy layer is 20% of the thickness of the aluminum alloy product. In some embodiments, the thickness of the first additional aluminum alloy layer is 30% of the thickness of the aluminum alloy product. In some embodiments, the thickness of the first additional aluminum alloy layer is 40% of the thickness of the aluminum alloy product. In some embodiments, the thickness of the first additional aluminum alloy layer is 50% of the thickness of the aluminum alloy product.

In some embodiments, the aluminum alloy product further includes a second additional aluminum alloy layer. In some embodiments, the second additional aluminum alloy layer has a third aluminum alloy composition.

In some embodiments, the base aluminum alloy layer is configured as an energy absorption core and the first and second additional aluminum alloy layers are configured as corrosion resistant layers.

In some embodiments, the second additional aluminum alloy layer may include ASTM standard aluminum alloy from 1xxx, 2xxx, 3xxx, 4xxx, 5xxx, 6xxx, 7xxx, and 8xxx series. In some embodiments, the second additional aluminum alloy layer composition includes 0.20-8.0 wt. % magnesium and the magnesium is a predominate alloying element of the second additional aluminum alloy layer other than aluminum. In some embodiments, the first additional aluminum alloy layer composition includes 1.0-7.0 wt. % magnesium. In some embodiments, the first additional aluminum alloy layer composition includes 2.0-6.0 wt. % magnesium. In some embodiments, the first additional aluminum alloy layer composition includes 3.0-5.0 wt. % magnesium. In some embodiments, the first additional aluminum alloy layer composition includes 0.5-7.0 wt. % magnesium. In some embodiments, the first additional aluminum alloy layer composition includes 0.2 wt. % magnesium. In some embodiments, the first additional aluminum alloy layer composition includes 1.0 wt. % magnesium. In some embodiments, the first additional aluminum alloy layer composition includes 3.0 wt. % magnesium. In some embodiments, the first additional aluminum alloy layer composition includes 5.0 wt. % magnesium.

In some embodiments, the second additional aluminum alloy layer is a 5xxx series alloy. In some embodiments, the second additional aluminum alloy layer is a 5456 alloy. In some embodiments, the second additional aluminum alloy is a 5454 alloy. In some embodiments, the second additional aluminum alloy layer has the same composition as the first additional aluminum alloy layer.

In some embodiments, the thickness of the second additional aluminum alloy layer ranges from 10% to 80% of the thickness of the aluminum alloy product. In some embodiments, the thickness of the second additional aluminum alloy layer ranges from 20% to 70% of the thickness of the aluminum alloy product. In some embodiments, the thickness of the second additional aluminum alloy layer ranges from 15% to 60% of the thickness of the aluminum alloy product. In some embodiments, the thickness of the second additional aluminum alloy layer ranges from 20% to 50% of the thickness of the aluminum alloy product. In some embodiments, the second additional aluminum alloy layer is less than 70% of the thickness of the aluminum alloy product. In some embodiments, the thickness of the second additional aluminum alloy layer is less than 50% of the thickness of the aluminum alloy product. In some embodiments, the thickness of the second additional aluminum alloy layer is 10% of the thickness of the aluminum alloy product. In some embodiments, the thickness of the second additional aluminum alloy layer is 20% of the thickness of the aluminum alloy product. In some embodiments, the thickness of the second additional aluminum alloy layer is 30% of the thickness of the aluminum alloy product. In some embodiments, the thickness of the second additional aluminum alloy layer is 40% of the thickness of the aluminum alloy product.

In some embodiments, the base layer is 20% to 60% of the thickness of the aluminum alloy product, the first additional aluminum alloy layer is 20% to 60% of the thickness of the aluminum alloy product, and the second additional aluminum alloy layer is 10% to 40% of the thickness of the aluminum alloy product. In some embodiments, the base layer is 30% to 50% of the thickness of the aluminum alloy product, the first additional aluminum alloy layer is 30% to 50% of the thickness of the aluminum alloy product, and the second additional aluminum alloy layer is 10% to 30% of the thickness of the aluminum alloy product. In some embodiments, the base layer is 40% of the thickness of the aluminum alloy product, the first additional aluminum alloy layer is 40% of the thickness of the aluminum alloy product, and the second additional aluminum alloy layer is 20% of the thickness of the aluminum alloy product.

In some embodiments, the base layer is positioned between the first additional aluminum alloy layer and the second additional aluminum alloy layer. In some embodiments, the base aluminum alloy layer, first additional aluminum alloy layer, and the second additional aluminum alloy layer are cast by roll bonding, SAC, direct chill casting, and/or other method for forming a multilayer product. In some embodiments, the base aluminum alloy layer, first additional aluminum alloy layer, and the second additional aluminum alloy layer are cast in discrete or graduated layers.

In some embodiments, the aluminum alloy product includes one or more additional aluminum alloy layers that may include ASTM standard aluminum alloy from 1xxx, 2xxx, 3xxx, 4xxx, 5xxx, 6xxx, 7xxx, and 8xxx series. In some embodiments, the one or more additional aluminum alloy layers may have similar characteristics such as composition ranges and thicknesses as described above for the base, first additional, and second additional aluminum alloy layers.

Figure 2:
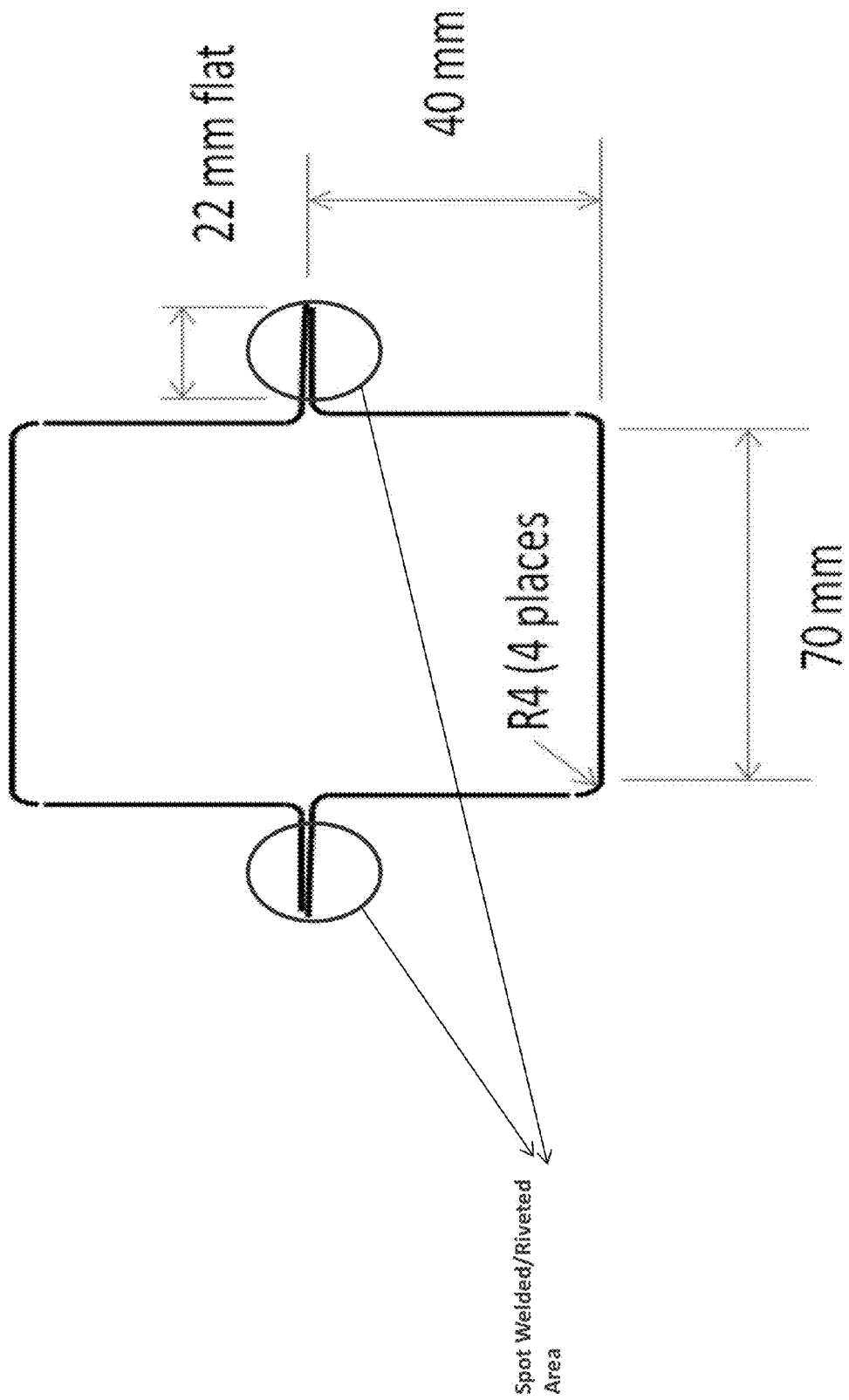
FIG. 2 illustrates features of some embodiments of the present invention.

In some embodiments, when the automobile component of the present invention is tested using a static axial crush test, a peak load of the automobile component increases at least 20% when compared to alloy 6014 in the T6 temper. As used herein, a static axial crust test includes the following steps:

Providing a sample having a double hat configuration as shown in FIG. 2;

Applying an axial compressive load to the sample at a rate of 50 millimeters per minute; and Measuring the load while maintaining a controlled displacement of the sample.

The alloy 6014 in the T6 temper is traditionally used to form crashworthy structures in automobiles.

In some embodiments, when the automobile component of the present invention is tested using a static axial crush test, a peak load of the automobile component increases 10% to 100% when compared to alloy 6014 in the T6 temper. In some embodiments, when the automobile component of the present invention is tested using a static axial crush test, a peak load of the automobile component increases 20% to 80% when compared to alloy 6014 in the T6 temper. In some embodiments, when the automobile component of the present invention is tested using a static axial crush test, a peak load of the automobile component increases at least 70% when compared to alloy 6014 in the T6 temper. In some embodiments, when the automobile component of the present invention is tested using a static axial crush test, a peak load of the automobile component increases 30% to 70% when compared to alloy 6014 in the T6 temper. In some embodiments, when the automobile component of the present invention is tested using a static axial crush test, a peak load of the automobile component increases at least 50% when compared to alloy 6014 in the T6 temper. In some embodiments, when the automobile component of the present invention is tested using a static axial crush test, a peak load of the automobile component increases 20% when compared to alloy 6014 in the T6 temper. In some embodiments, when the automobile component of the present invention is tested using a static axial crush test, a peak load of the automobile component increases 40% when compared to alloy 6014 in the T6 temper. In some embodiments, when the automobile component of the present invention is tested using a static axial crush test, a peak load of the automobile component increases 50% when compared to alloy 6014 in the T6 temper.

In some embodiments, when the automobile component of the present invention is tested using a static axial crush test, a mean load of the automobile component increases 10% to 100% when compared to alloy 6014 in the T6 temper. In some embodiments, when the automobile component of the present invention is tested using a static axial crush test, a mean load of the automobile component increases 10% to 80% when compared to alloy 6014 in the T6 temper. In some embodiments, when the automobile component of the present invention is tested using a static axial crush test, a mean load of the automobile component increases at least 70% when compared to alloy 6014 in the T6 temper. In some embodiments, when the automobile component of the present invention is tested using a static axial crush test, a mean load of the automobile component increases 30% to 70% when compared to alloy 6014 in the T6 temper. In some embodiments, when the automobile component of the present invention is tested using a static axial crush test, a mean load of the automobile component increases at least 50% when compared to alloy 6014 in the T6 temper. In some embodiments, when the automobile component of the present invention is tested using a static axial crush test, a mean load of the automobile component increases 10% when compared to alloy 6014 in the T6 temper. In some embodiments, when the automobile component of the present invention is tested using a static axial crush test, a mean load of the automobile component increases 20% when compared to alloy 6014 in the T6 temper. In some embodiments, when the automobile component of the present invention is tested using a static axial crush test, a mean load of the automobile component increases 30% when compared to alloy 6014 in the T6 temper.

In some embodiments, the energy absorption of the automobile component is calculated based on the mean load and the change in height of the component ("the stroke"). Thus, in some embodiments, the energy absorption of the automobile component is expected to have similar range of values as those described above for the mean load.

In some embodiments, the method of the present invention includes receiving an aluminum alloy body. In some embodiments, the aluminum alloy body includes a base aluminum alloy layer and at least a first additional aluminum alloy layer disposed directly on the base layer. In some embodiments, the aluminum alloy body further includes a second additional aluminum alloy layer.

In some embodiments, the base layer has a first aluminum alloy composition that includes 2.0-22 wt. % zinc and the zinc is a predominate alloying element of the base layer other than aluminum, the first and second additional aluminum alloy layers have a second aluminum alloy composition that includes 0.20-8 wt. % magnesium and the magnesium is a predominate alloying element of the first and second additional aluminum alloy layers other than aluminum.

In some embodiments, the base aluminum alloy layer is a 7xxx series alloy. In some embodiments, the base layer is a 7085 alloy. In some embodiments, the first and/or second additional aluminum alloy layers are 5xxx series alloys. In some embodiments, the first and/or second additional aluminum alloy layers are 5456 alloys. In some embodiments, the first and/or second additional aluminum alloy layers are 5454 alloys.

In some embodiments, the layers of the aluminum alloy body are cast by roll bonding, SAC, direct chill casting, and/or other method for forming a multilayer product. In some embodiments, the layers are cast in discrete or graduated layers.

In some embodiments, the aluminum alloy body is rolled using hot rolling, cold rolling, or combinations thereof. In some embodiments, the aluminum alloy body is rolled at any temperature above the recrystallization temperature of the aluminum alloy body. In some embodiments, the aluminum alloy body is rolled at a temperature below the recrystallization temperature of the aluminum alloy body.

In some embodiments, the aluminum alloy body is rolled to reduce a thickness of the aluminum alloy body from 10% to 95%. In some embodiments, the aluminum alloy body is rolled to reduce a thickness of the aluminum alloy body from 20% to 90%. In some embodiments, the aluminum alloy body is rolled to reduce a thickness of the aluminum alloy body at least 90%. In some embodiments, the aluminum alloy body is rolled to reduce a thickness of the aluminum alloy body from 40% to 75%. In some embodiments, the aluminum alloy body is rolled to reduce a thickness of the aluminum alloy body at least 80%. In some embodiments, the aluminum alloy body is rolled to reduce a thickness of the aluminum alloy body 90%. In some embodiments, the aluminum alloy body is rolled to reduce a thickness of the aluminum alloy body from 80%. In some embodiments, the aluminum alloy body is rolled to reduce a thickness of the aluminum alloy body 95%.

In some embodiment, the aluminum alloy body is rolled to a thickness ranging from 0.006 to 0.25 inches. In some embodiment, the aluminum alloy body is rolled to a thickness ranging from 0.1 to 0.23 inches. In some embodiment, the aluminum alloy body is rolled to a thickness ranging from 0.05 to 0.2 inches. In some embodiment, the aluminum alloy body is rolled to a thickness less than 0.2 inches. In some embodiment, the aluminum alloy body is rolled to a thickness ranging of 0.1 inches. In some embodiment, the aluminum alloy body is rolled to a thickness ranging from 0.1 to 0.15 inches. In some embodiment, the aluminum alloy body is rolled to a thickness of 0.15 inches. In some embodiment, the aluminum alloy body is rolled to a thickness ranging from 0.01 to about 0.1 inches.

In some embodiments, the product of the present invention may be used in other non-automotive applications such as use in ground transportation, aerospace, and marine industries and the like.

In some embodiments, the method further includes thermally treating the aluminum alloy body. In some embodiments, the thermally treating step includes thermally treating the rolled aluminum alloy body.

In some embodiments, the thermal treatment step comprises heating the rolled aluminum alloy body to a temperature of at least 250 degrees Fahrenheit for a duration of at least 4 hours. In some embodiments, the thermal treatment step comprises heating the rolled aluminum alloy body to a temperature of at least 250 degrees Fahrenheit for a duration of at least 8 hours. In some embodiments, the thermal treatment step comprises heating the rolled aluminum alloy body to a temperature of at least 250 degrees Fahrenheit for a duration of at least 12 hours. In some embodiments, the thermal treatment step comprises heating the rolled aluminum alloy body to a temperature of at least 250 degrees Fahrenheit for a duration of 8 to 16 hours. In some embodiments, the thermal treatment step comprises heating the rolled aluminum alloy body to a temperature of at least 250 degrees Fahrenheit for a duration of at least 24 hours. In some embodiments, the thermal treatment step comprises heating the rolled aluminum alloy body to a temperature of at least 250 degrees Fahrenheit for a duration of 16 to 24 hours. In some embodiments, the thermal treatment step comprises heating the rolled aluminum alloy body to a temperature of at least 250 degrees Fahrenheit for a duration of 24 hours.

In some embodiments, the thermal treatment step comprises heating the rolled aluminum alloy body to a temperature of at least 300 degrees Fahrenheit for a duration of at least 4 hours. In some embodiments, the thermal treatment step comprises heating the rolled aluminum alloy body to a temperature of at least 300 degrees Fahrenheit for a duration of at least 8 hours. In some embodiments, the thermal treatment step comprises heating the rolled aluminum alloy body to a temperature of at least 300 degrees Fahrenheit for a duration of at least 12 hours. In some embodiments, the thermal treatment step comprises heating the rolled aluminum alloy body to a temperature of at least 300 degrees Fahrenheit for a duration of 8 to 16 hours. In some embodiments, the thermal treatment step comprises heating the rolled aluminum alloy body to a temperature of at least 300 degrees Fahrenheit for a duration of at least 24 hours. In some embodiments, the thermal treatment step comprises heating the rolled aluminum alloy body to a temperature of at least 300 degrees Fahrenheit for a duration of 16 to 24 hours. In some embodiments, the thermal treatment step comprises heating the rolled aluminum alloy body to a temperature of at least 300 degrees Fahrenheit for a duration of 24 hours.

In some embodiments, the thermal treatment step comprises heating the rolled aluminum alloy body to a temperature of at least 350 degrees Fahrenheit for a duration of at least 4 hours. In some embodiments, the thermal treatment step comprises heating the rolled aluminum alloy body to a temperature of at least 350 degrees Fahrenheit for a duration of at least 8 hours. In some embodiments, the thermal treatment step comprises heating the rolled aluminum alloy body to a temperature of at least 350 degrees Fahrenheit for a duration of at least 12 hours. In some embodiments, the thermal treatment step comprises heating the rolled aluminum alloy body to a temperature of at least 350 degrees Fahrenheit for a duration of 8 to 16 hours. In some embodiments, the thermal treatment step comprises heating the rolled aluminum alloy body to a temperature of at least 350 degrees Fahrenheit for a duration of at least 24 hours. In some embodiments, the thermal treatment step comprises heating the rolled aluminum alloy body to a temperature of at least 350 degrees Fahrenheit for a duration of 16 to 24 hours. In some embodiments, the thermal treatment step comprises heating the rolled aluminum alloy body to a temperature of at least 350 degrees Fahrenheit for a duration of 24 hours.

In some embodiments, the method includes forming the aluminum alloy body into an automobile component. In some embodiments, the method includes forming the thermally treated aluminum alloy body into an automobile component. In some embodiments, the automobile component may include outer panel sections 110, high form inner sections 120, reinforcement sections 130, crash sections 140, large flat panel sections 150, and/or high strength sections 160 as shown on FIG. 1.

In some embodiments, the automobile component formed by the method of the present invention, when tested using a static axial crush test, a peak load of the automobile component increases at least 20% when compared to alloy 6014 in the T6 temper. In some embodiments, the peak load and/or mean load of the automobile component formed by the method of the present invention increases as described above for the product of the present invention.

In some embodiments, the method may further include subject the aluminum alloy body to other heat treatment technique such as solution heat treatment.

Illustrative Examples

A non-limiting example of the testing of an embodiment of the present invention is described below. In the example, reference materials included samples A-1 and A-2. The samples were formed of sheet materials having a thickness of 2.5 millimeters and a width of ranging from 133.2 millimeters to 141 millimeters. The reference materials were compared to samples of the products of an embodiment of the present invention formed by a SAC process (hereinafter "SAC-1" and "SAC-2").

The A-1 and A-2 samples included a 75 mm×75 mm sheet formed in a double hat configuration as shown in FIG. 2. The A-1 and A-2 samples were resistance spot welded on the flanges. The A-1 and A-2 samples were also 381 mm in length.

Figure 3:
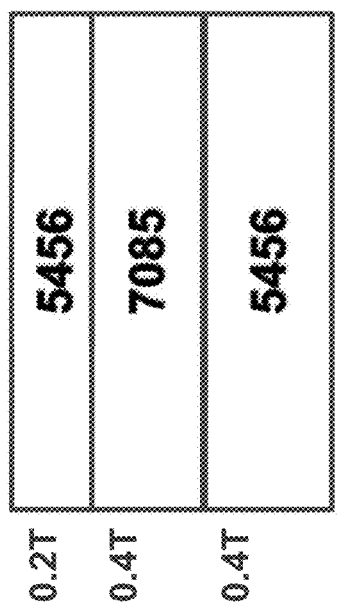
FIG. 3 illustrates features of some embodiments of the present invention.

The SAC-1 and SAC-2 samples were formed using a SAC process and included an alloy 7085 layer positioned between two alloy 5456 layers configured as shown in FIG. 3. As shown on FIG. 3, the thickness of the top 5456 layer is about 20% of the total thickness of the samples. Also shown in FIG. 3, the thicknesses of the 7085 layer and the bottom 5456 layer are each about 40% of the total thickness of the samples. The SAC-1 and SAC-2 samples were also forged to a thickness of about 2 inches and then hot and cold rolled to a thickness of about 0.1 inches. The SAC-1 and SAC-2 samples were formed in a double hat configuration as shown in FIG. 2 and riveted on the flanges. The length of the samples was 200 mm.

The A-1 and A-2 samples were subjected to different thermal treatment as illustrated in the Table 1:

TABLE 1

| Alloy | Specimen | Geometery, mm | Age Time, hrs | Temp, deg F. | Comment |
|---|---|---|---|---|---|
| A | 1 | 75 × 75, D | 2 | 356 | Isothermal Aging |
|   | 2 |   |   |   |   |
| A | 1 | 75 × 75, D | 0.225 | 280 | Age Integration, Strength 190 Mpa |
|   | 2 |   |   |   |   |

The A-1 and A-2 samples had a final thickness of 0.08 inches. For clarity, the A-1 and A-2 samples subject to isothermal aging are referred to as A-1I and A-2I and the samples subjected to age integration are referred to as A-1A and A-2A The SAC-1 and SAC-2 samples were subject to thermal treatment as illustrated in Table 2:

TABLE 2

| Alloys | Specimen | Geometry, mm | Step 1 Age Time, hrs | Step 1 Temp, deg F. | Step 2 Age Time, hrs | Step 2 Temp, deg F. |
|---|---|---|---|---|---|---|
| 5456/ 7085/ 5456 | 1 2 | 75 × 75, D | 24 | 250 | 4 | 340 |

The mechanical properties of each of the samples were measured and identified in the Table 3:

TABLE 3

| | TYS (MPa) | UTS (MPa) | Elongation (%) |
|---|---|---|---|
| A-1I and A-2I | 264 | 318 | 18.2 |
| A-1A and A-2A | 189 | 287 | 26.8 |
| SAC-1 and SAC-2 | 304* | 419 | 14.2 |

*SAC includes two yield points due to the different alloy in each product layer. The TYS result corresponds to the first yield point.

The six samples, A-1I, A-2I, A-1A, A-2A, SAC-1 and SAC-2 were then subjected to a "static axial crush test". As used herein, a static axial crush test includes the following:

Providing a sample having a double hat configuration as shown in FIG. 2;

Applying an axial compressive load to the sample at a rate of 50 millimeters per minute; and Measuring the load while maintaining a controlled displacement of the sample.

Figure 4:
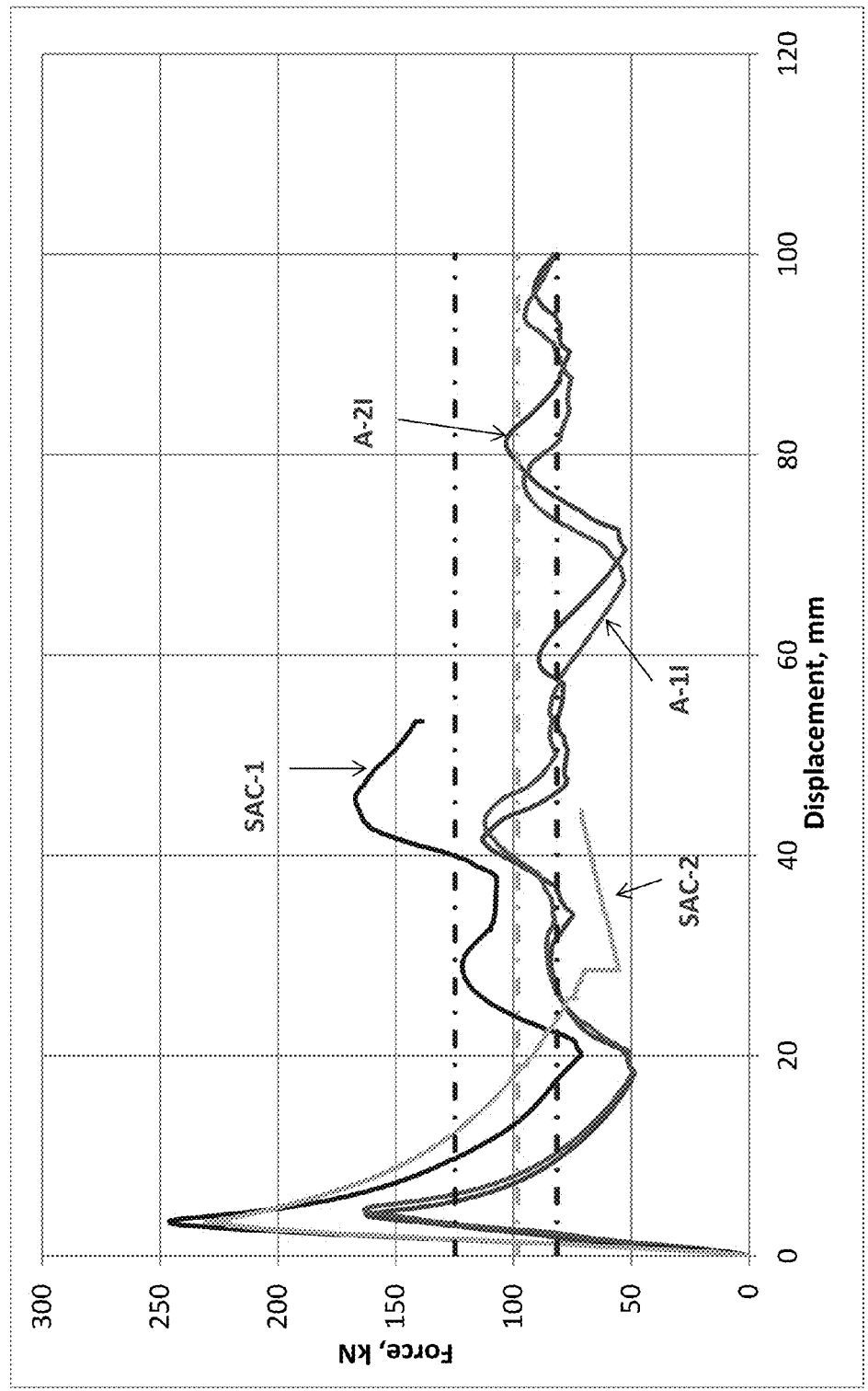
FIG. 4 illustrates features of some embodiments of the present invention.

The results of the testing conducted on A-1I and A-2I compared with SAC-1 and SAC-2 are shown on FIG. 4. In the example, the testing of the SAC-1 and SAC-2 samples was suspended at 56 and 43 mm stroke (change in height of the sample) due to the buckling issues and side loading generated by the testing device—i.e., the hydraulic machine. As shown in Table 4 and FIG. 4, the peak load ("Max Load, Pmax") for the SAC-1 and SAC-2 samples are higher than the peak loads associated with the A-1I and A-2I samples. Moreover, the mean loads for the SAC-1 and SAC-2 samples are higher than the mean loads associated with the A-1I and A-2I.

TABLE 4

|  | A-1I | A-2I | SAC-1 | SAC-2 |
|---|---|---|---|---|
| Max Load, Pmax (kN) | 163.40 | 162.47 | 245.98 | 230.54 |
| Mean Load, Pmean (kN) | 81.71 | 81.31 | 124.89 | 98.3 |
| Energy Absorb, Ea (kJ) | 8.18 | 8.14 | 6.67 | 4.40 |
| Stroke, d (mm) | 100 | 100 | 53.38 | 43.38 |

Figure 5:
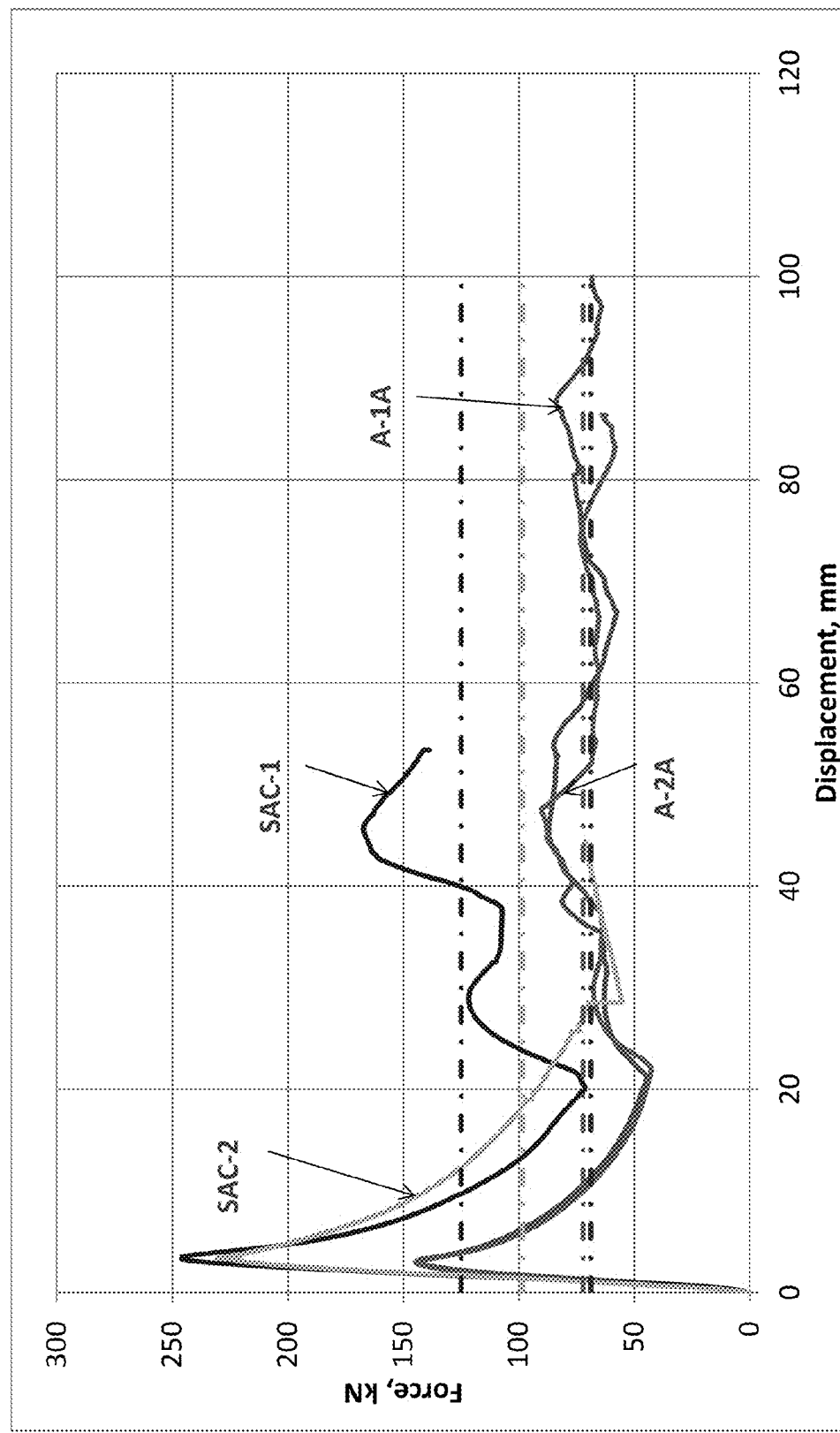
FIG. 5 illustrates features of some embodiments of the present invention.
Figure 6A:
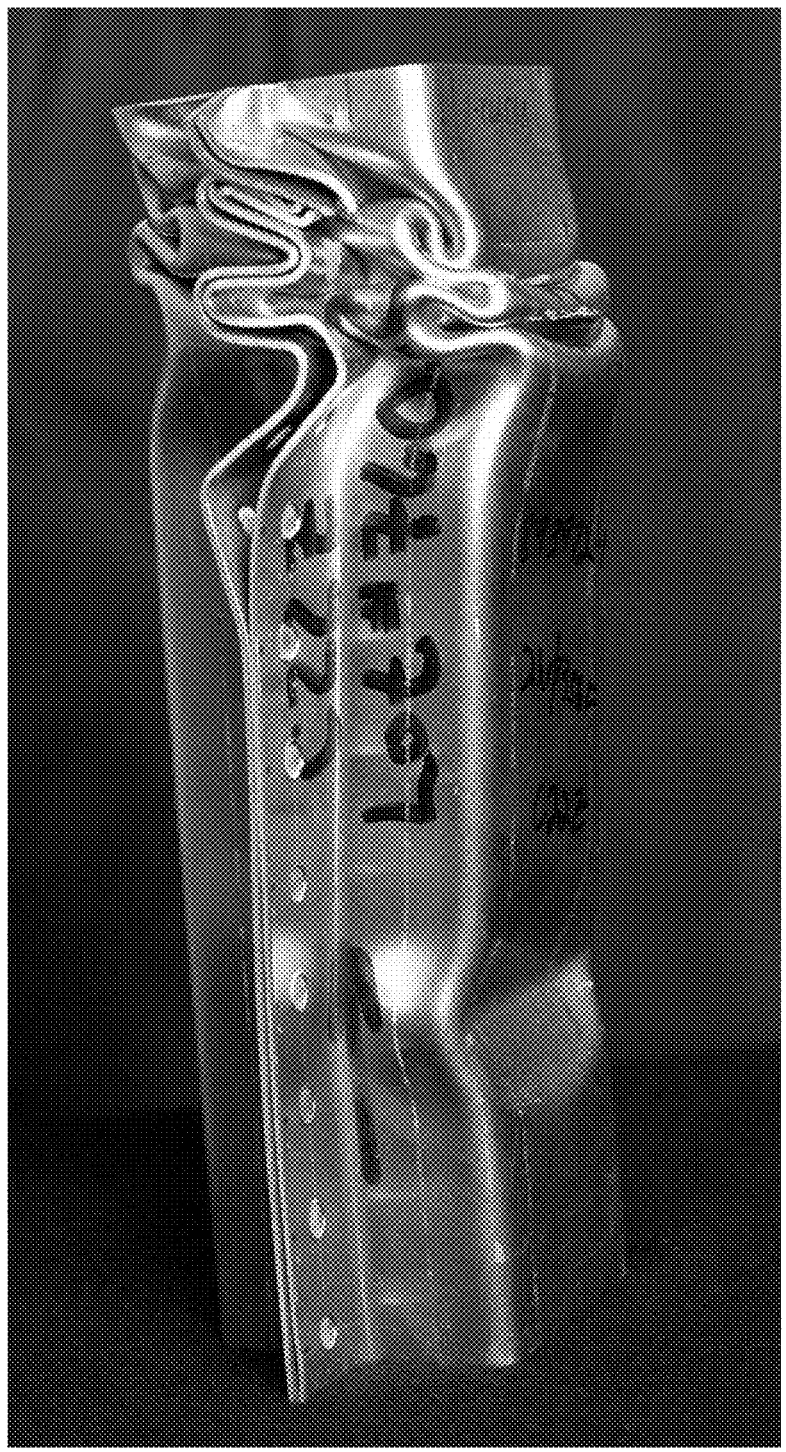
FIGS. 6a and 6b illustrate features of some embodiments of the present invention.
Figure 6B:
Figure 7A:
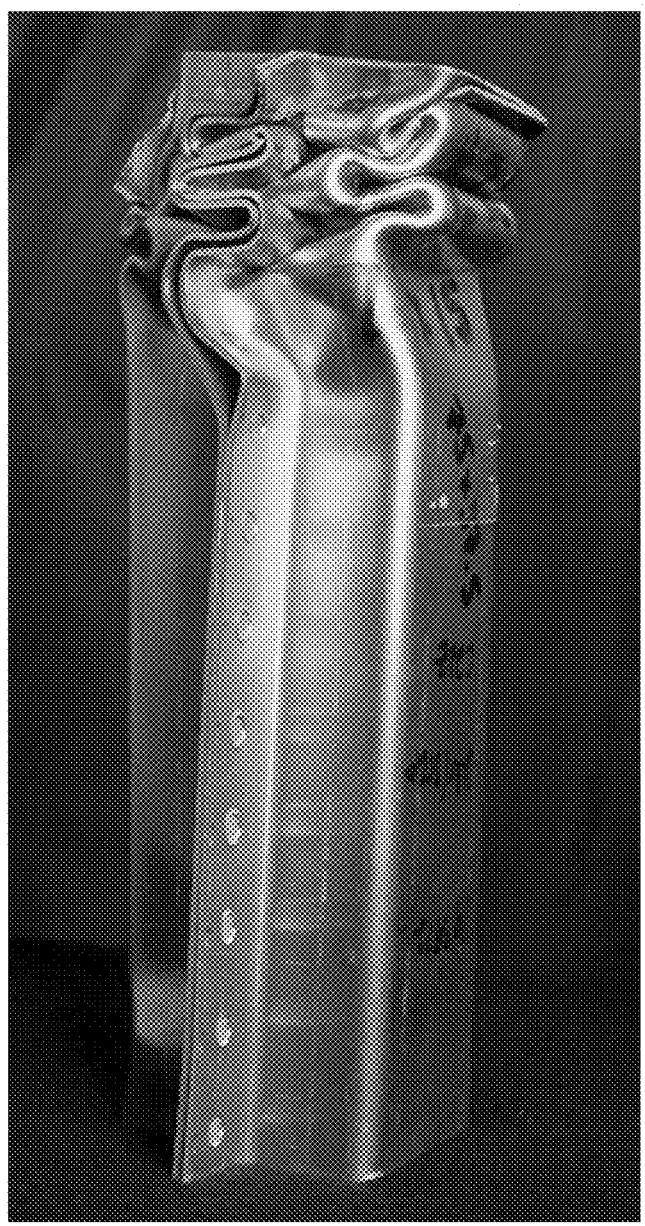
FIGS. 7a and 7b illustrate features of some embodiments of the present invention.
Figure 7B:
Figure 8A:
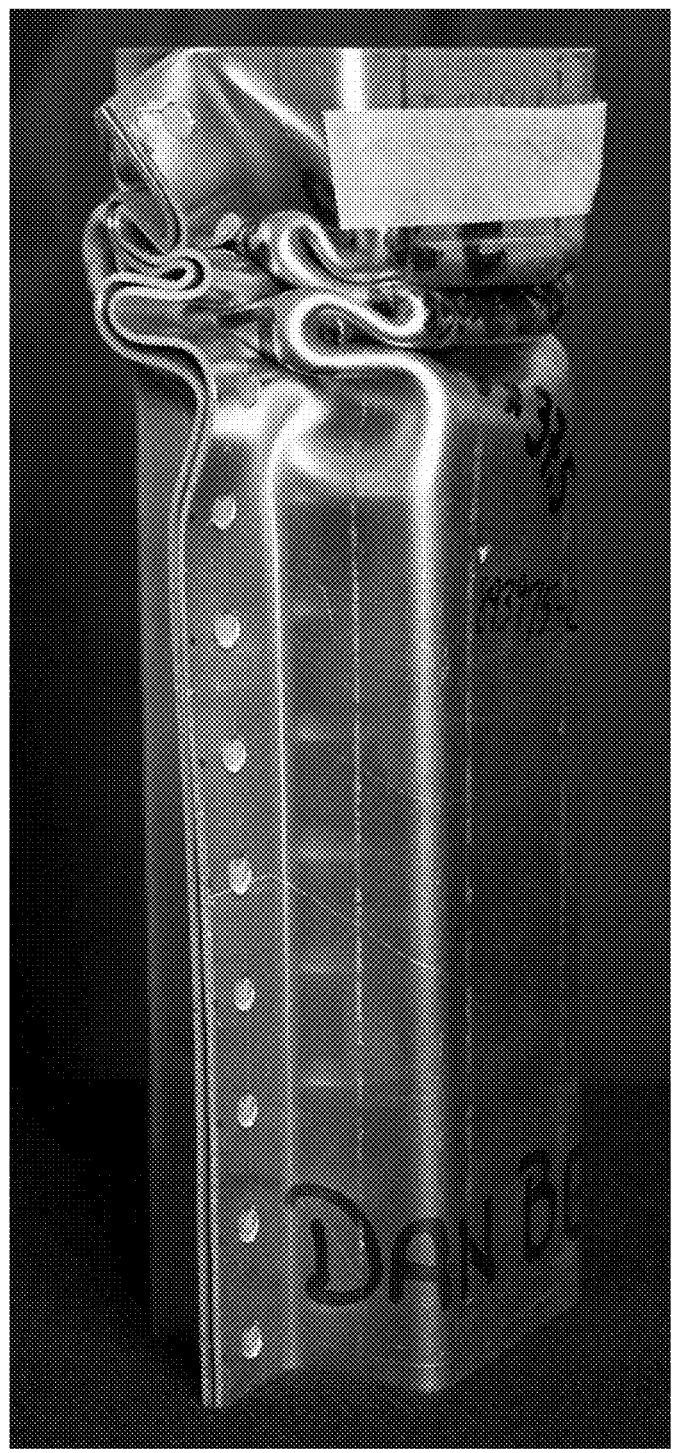
FIGS. 8a and 8b illustrate features of some embodiments of the present invention.
Figure 8B:
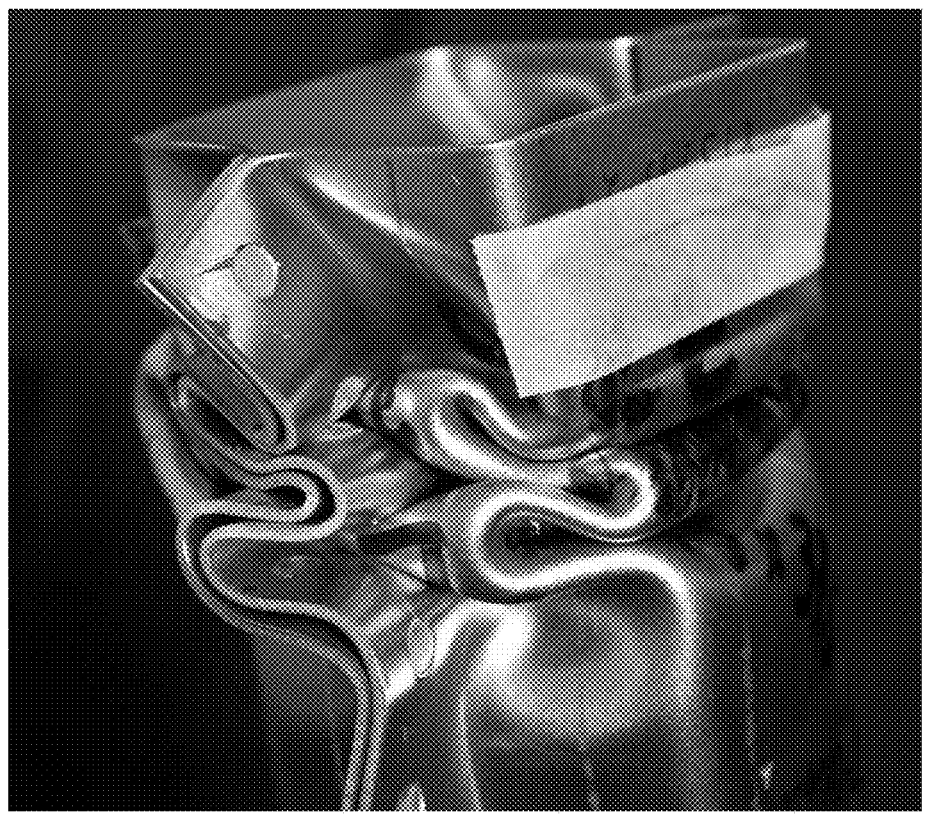
Figure 9A:
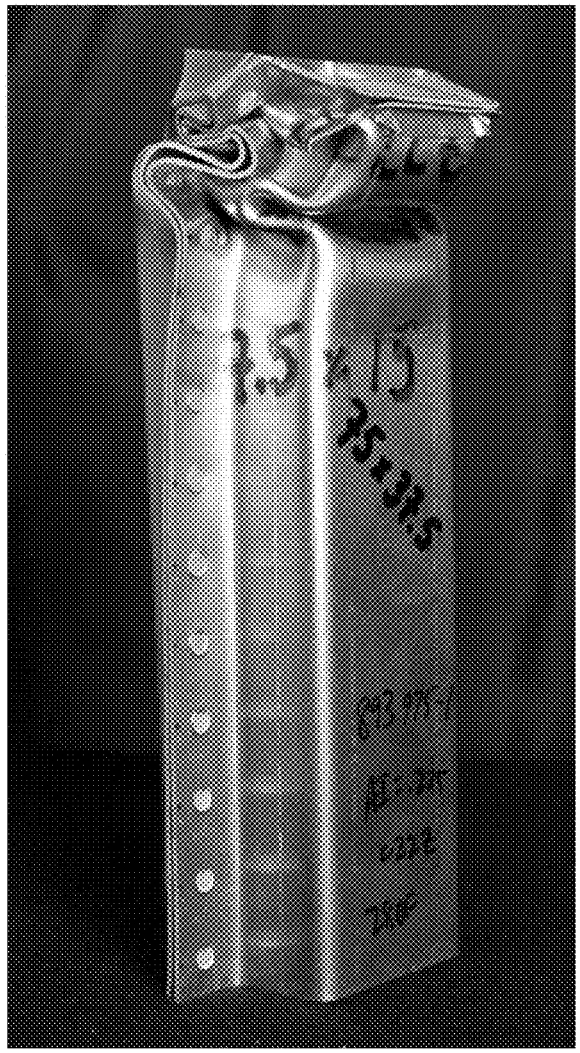
FIGS. 9a and 9b illustrate features of some embodiments of the present invention.
Figure 9B:
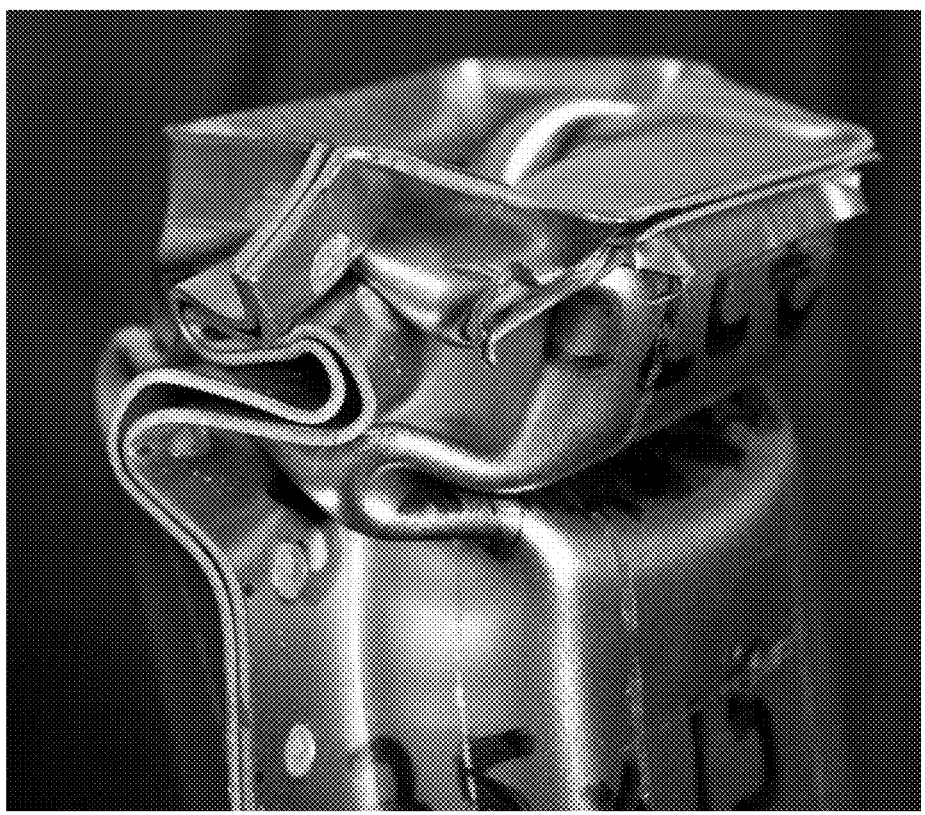
Figure 10:
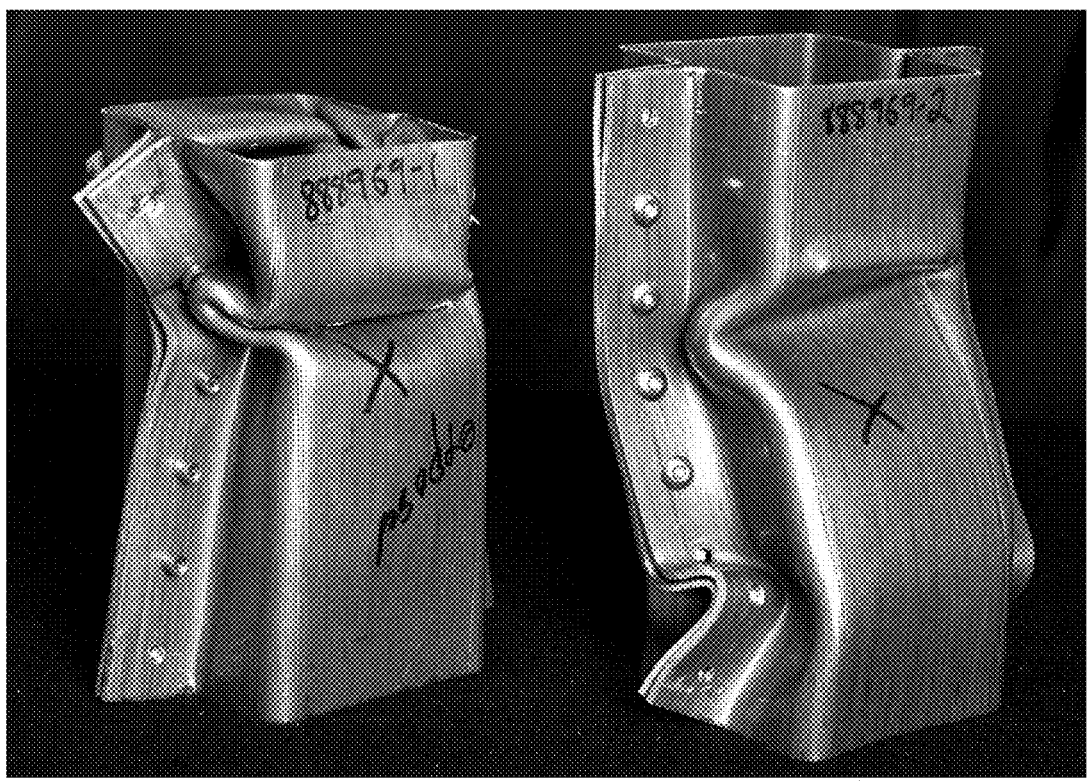
FIG. 10 illustrates features of some embodiments of the present invention.
Figure 11A:
FIGS. 11a and 11b illustrate features of some embodiments of the present invention.
Figure 11B:
Figure 12:
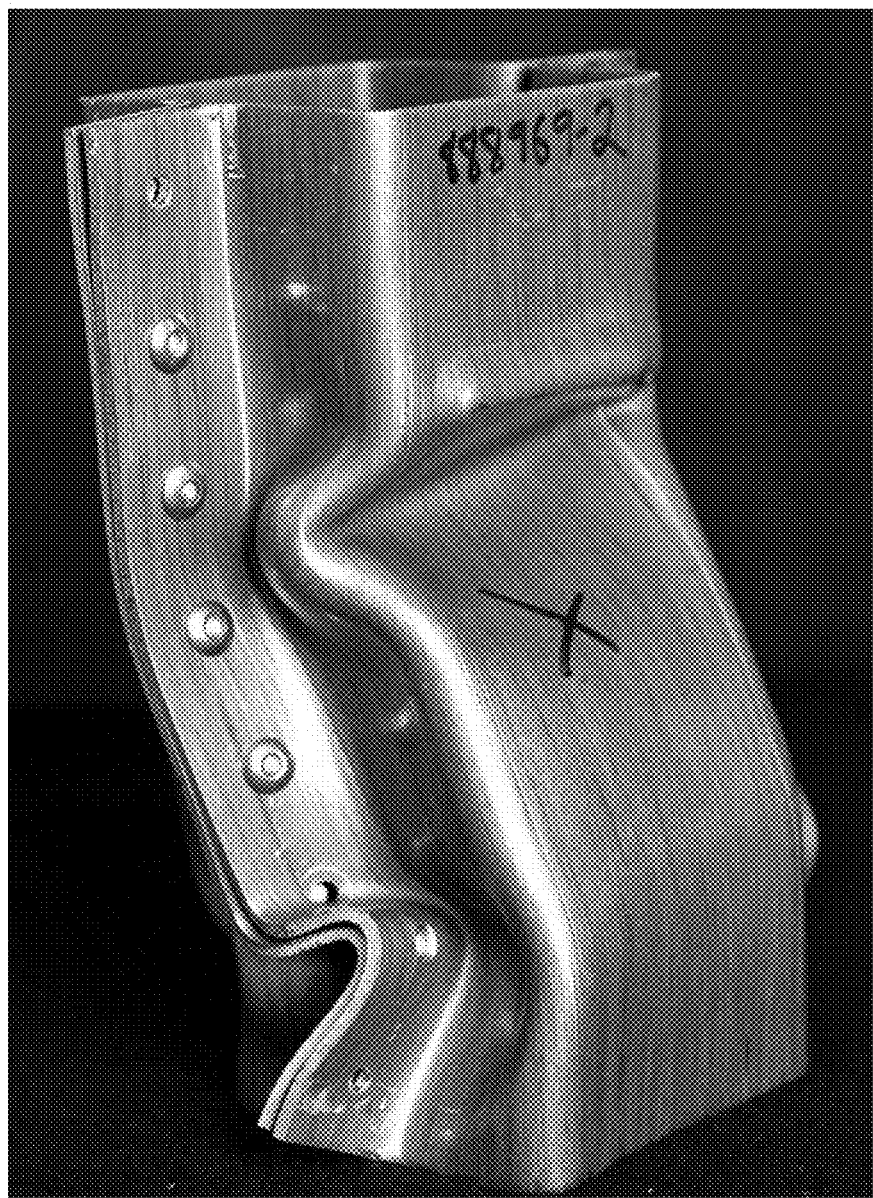
FIG. 12 illustrates features of some embodiments of the present invention.
Figure 13A:
FIGS. 13a and 13b illustrate features of some embodiments of the present invention.
Figure 13B:

The results of the testing conducted on A-1A and A-2A compared with SAC-1 and SAC-2 are shown on FIG. 5. As shown in Table 5 and FIG. 5, the peak load ("Max Load, Pmax") for the SAC-1 and SAC-2 samples are higher than the peak loads associated with the A-1A and A-2A samples. Moreover, the mean loads for the SAC-1 and SAC-2 samples are higher than the mean loads associated with the A-1A and A-2A.

TABLE 5

|  | A-1A | A-2A | SAC-1 | SAC-2 |
|---|---|---|---|---|
| Max Load, Pmax (kN) | 144.67 | 144.11 | 245.98 | 230.54 |
| Energy Absorb, Ea (kJ) | 5.99 | 7.21 | 6.67 | 4.40 |
| Mean Load, Pmean (kN) | 68.87 | 72.15 | 124.89 | 98.3 |
| Stroke, d (mm) | 86.35 | 100 | 53.38 | 43.38 |

Specific embodiments of the present apparatus and methods thereof, have been described and illustrated. It will be understood to those skilled in the art that changes and modifications may be made without departing from the spirit and scope of the inventions defined by the appended non-limiting paragraphs.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. An automobile component comprising:
an aluminum alloy product, wherein the aluminum alloy product comprises:
a base aluminum alloy layer and at least a first additional aluminum alloy layer disposed directly on the base layer;
wherein the base layer has a first aluminum alloy composition;
wherein the first aluminum alloy composition includes 2.0 to 22 wt. % zinc and the zinc is a predominate alloying element of the base layer other than aluminum;
wherein the first additional aluminum alloy layer has a second aluminum alloy composition;
wherein the second aluminum alloy composition includes 0.20 to 8.0 wt. % magnesium and the magnesium is a predominate alloying element of the first additional aluminum alloy layer other than aluminum;
wherein the automobile component is selected from the group consisting of outer panel sections, high form inner sections, reinforcement sections, crash sections, large flat panel sections, and high strength sections; and
wherein, when tested in a static axial crush test, a peak load of the automobile component increases at least 20% when compared to alloy 6014 in the T6 temper.

2. The automobile component of claim 1, wherein the aluminum alloy product further comprises a second additional aluminum alloy layer.

3. The automobile component of claim 2, wherein the second additional aluminum alloy layer has a third aluminum alloy composition.

4. The automobile component of claim 3, wherein the first additional aluminum alloy layer and the second additional aluminum alloy layer have the same compositions.

5. The automobile component of claim 2, wherein the base layer is positioned between the first additional aluminum alloy layer and the second additional aluminum alloy layer.

6. The automobile component of claim 5, wherein a thickness of the base layer comprises between 20% and 50% of a thickness of the aluminum alloy product.

7. The automobile component of claim 2, wherein the first additional aluminum alloy layer and the second additional aluminum alloy layer are 5xxx series alloys.

8. The automobile component of claim 7, wherein the first additional aluminum alloy layer and the second additional aluminum alloy layer are 5456 alloys and the base layer is a 7xxx series alloy.

9. The automobile component of claim 8, wherein the base layer is a 7085 alloy.

10. The automobile component of claim 1, wherein, when tested in a static axial crush test, a mean load of the aluminum alloy product increases at least 10% when compared to alloy 6014 in the T6 temper.

11. The automobile component of any of claims 1-10, wherein the automobile component is a crash section.

12. A method comprising:
(a) receiving an aluminum alloy body; wherein the aluminum alloy body comprises a base aluminum alloy layer and at least a first additional aluminum alloy layer disposed directly on the base layer;
wherein the base layer has a first aluminum alloy composition;
wherein the first aluminum alloy composition includes 2.0 to 22 wt. % zinc and the zinc is a predominate alloying element of the base layer other than aluminum;
wherein the first additional aluminum alloy layer has a second aluminum alloy composition;
wherein the second aluminum alloy composition includes 0.20 to 8 wt. % magnesium and the magnesium is a predominate alloying element of the first additional aluminum alloy layer other than aluminum; and
(b) rolling the aluminum alloy body;
(c) thermally treating the rolled aluminum alloy body; and
(d) forming the thermally treated aluminum alloy body into an automobile component selected from the group consisting of outer panel sections, high form inner sections, reinforcement sections, crash sections, large flat panel sections, and high strength sections,
wherein, when tested in a static axial crush test, a peak load of the automobile component increases at least 20% when compared to alloy 6014 in the T6 temper.

13. The method of claim 12, wherein the aluminum alloy body further comprises a second additional aluminum alloy layer.

14. The method of claim 13, wherein the first additional aluminum alloy layer and the second additional aluminum alloy layer are 5xxx series alloys and the based layer is a 7xxx series alloy.

15. The method of claim 14, wherein the first additional aluminum alloy layer and the second additional aluminum alloy layer are 5456 alloys and the base layer is a 7085 alloy.

16. The method of claim 12, wherein the rolling step comprises hot rolling, cold rolling, and/or combinations thereof.

17. The method of claim 16, wherein the rolling step comprises at least a 80% reduction in a thickness of the aluminum alloy body.

18. The method of claim 12, wherein the thermal treatment step comprises heating the rolled aluminum alloy body to a temperature of at least 250 degrees Fahrenheit for a duration of at least 4 hours.

19. The method of claim 18, wherein the thermal treatment step comprises heating the rolled aluminum alloy body to a temperature of at least 250 degrees Fahrenheit for a duration of 24 hours.

20. The method of claim 19, wherein the thermal treatment step further comprises heating the rolled aluminum body to a temperature of at least 300 degrees Fahrenheit for a duration of at least 4 hours.

21. The method of claim 12, wherein the forming step comprises forming the thermally treated aluminum alloy body into a crash section.

\* \* \* \* \*